United States Patent [19]

Chubb

[11] 4,037,579
[45] July 26, 1977

[54] ENERGY STORAGE-BOILER TANK USING SALT FUSION AND HEAT PIPING

[76] Inventor: Talbot A. Chubb, 5023 N. 38th St., Arlington, Va. 22207

[21] Appl. No.: 652,272

[22] Filed: Jan. 26, 1976

[51] Int. Cl.² ............................................ F24H 7/04
[52] U.S. Cl. ................................ 126/400; 165/104 S; 165/105
[58] Field of Search ............................ 165/104 S, 105; 126/400, 271, 375

[56] References Cited

U.S. PATENT DOCUMENTS

| | | | |
|---|---|---|---|
| 2,363,118 | 11/1944 | Chamberlain | 165/105 |
| 2,677,367 | 5/1954 | Telkes | 126/400 |
| 2,711,882 | 6/1955 | Narbutovskih | 165/105 |
| 3,029,596 | 4/1962 | Hanold et al. | 126/400 |
| 3,060,870 | 10/1962 | Hexdall | 126/400 |
| 3,817,322 | 6/1974 | Asselman et al. | 165/104 |

Primary Examiner—John J. Camby
Assistant Examiner—Larry I. Schwartz
Attorney, Agent, or Firm—R. S. Sciascia; Philip Schneider; Melvin L. Crane

[57] ABSTRACT

An energy storage system useful for storing energy due to sun light and making use of the stored energy when the sun is not shining. The storage tank system includes a liquid therein which is heated as a result of the sun's energy. The heated liquid evaporates and subsequently condenses onto cans of a salt. The condensing liquid heats the salt which stores the heat. The heated liquid vapors also condenses on steam pipes to produce steam for operating a turboelectric generator. When the sun is not shining the stored heat in the salt cans evaporates liquid which continues to condense on the steam pipes generating steam until the sun shines. A spray keeps the salt cans wet during the night time period.

7 Claims, 2 Drawing Figures

ENERGY STORAGE-BOILER TANK USING SALT FUSION AND HEAT PIPING

The invention described herein may be manufactured and used by or for the Government of the United States of America for Governmental purposes without the payment of any royalties thereon or therefor.

CROSS REFERENCE TO RELATED CASES

This invention is related to a previously filed solar energy system Ser. No. 568,970 filed Apr. 17, 1975 by the same inventor now U.S.Pat. No. 3,972,183.

BACKGROUND OF THE INVENTION

This invention relates to a system for generating electrical energy and more particularly to an energy storage-boiler tank which is a component of a solar energy power plant for indirectly producing electrical energy from the sun.

Heretofore many different systems have been used for producing electrical energy by use of a solar energy, such systems include solar cells, steam generators, etc.

The conventional approaches to obtaining power from sunlight in solar thermal power systems are to concentrate sunlight onto a light absorbing surface to produce a hot zone in which water is boiled to produce steam or in which a heat transfer medium such as liquid sodium is heated and used to carry heat to a central reservoir where the accumulated heat is used to operate a steam boiler. These approaches have the following difficulties: In the steam boiler approach, either many power generating systems must be used if large amounts of energy are to be produced, or steam must be collected over large distances. If good efficiency is to be maintained, the steam must be at high pressure and moderately high temperature, with the result that large costs are encountered in the form of high pressure tubing. Also, the daily heating and cooling of the long pipes mean that daily extension and contraction of the piping system is encountered, increasing the likelihood of mechanical failure. The latter problem is even greater with the use of a high temperature, heat transfer medium, and additional problems are encountered due to energy loss in the transfer lines due to heat conduction to the atmosphere. Extreme measures, such as vacuum jacketing, are resorted to in order to control this problem. A gas dissociation solar energy and transport cycle was invented (Ser. No. 568,970) to circumvent these difficulties. This invention results in delivery of large quantities of usable heat at a central station for storage and power generation.

SUMMARY OF THE INVENTION

An energy storage-boiler tank operative by solar energy to replace a steam generator of a conventional oil fired boiler or other boiler in a conventional electrical power plant. The energy storage-boiler is operative by solar energy or other suitable means which supplies heat sufficient for generating steam during sunlight hours as well as during non-sunlight hours. The system accomplishes this function by receiving energy from a solar energy collection field during the day, by storing this energy as heat and heat of fusion in energy storage salts and by transporting heat to boiler tubes for converting externally supplied water to high pressure steam therein.

DETAILED DESCRIPTION

Figure 1:
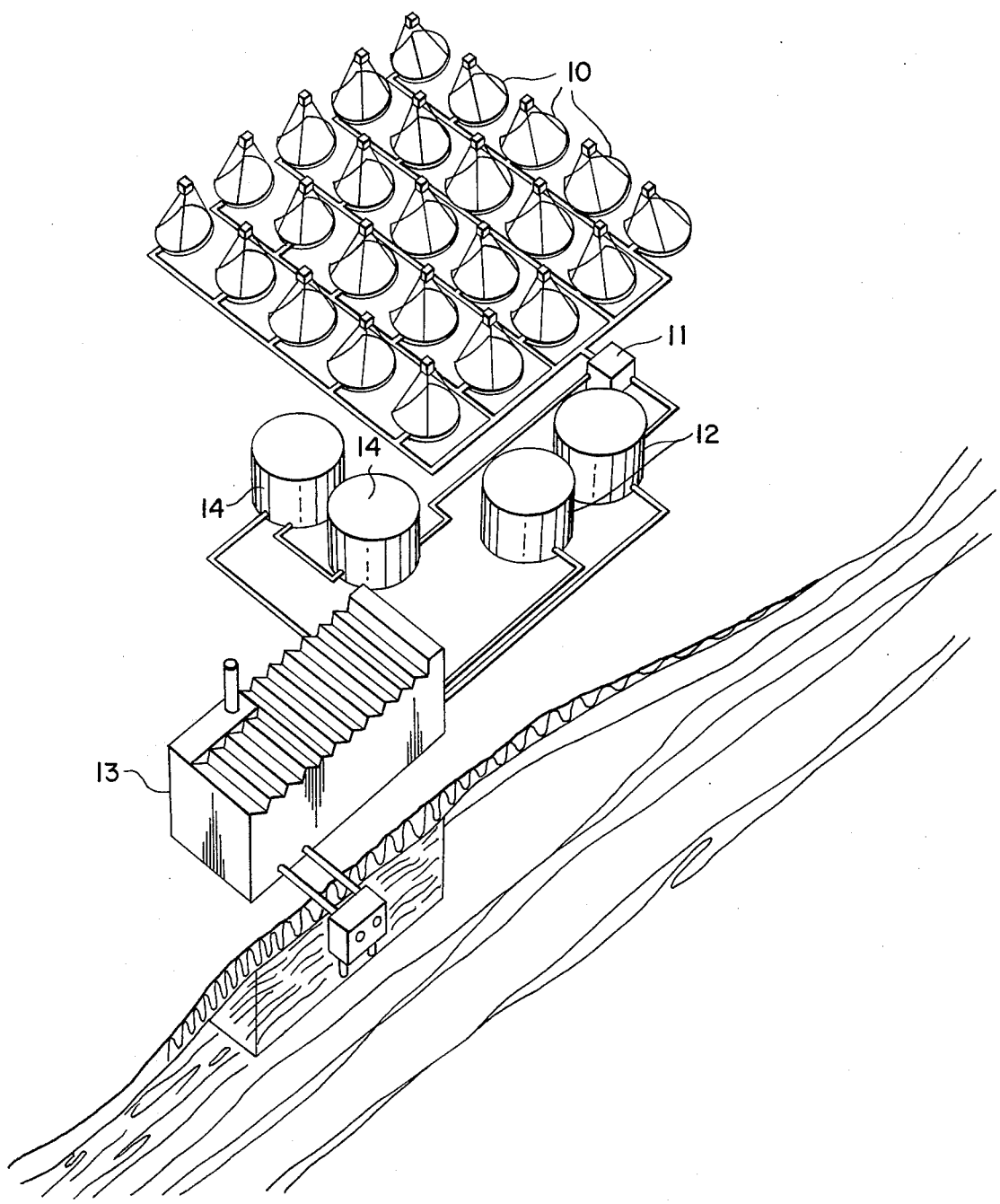
FIG. 1 illustrates a schematic drawing of the overall system.

Now referring to the drawings there is shown by illustration a solar energy power plant which includes therein an energy storage-boiler tank which may be used to produce steam for a steam generator or any other use. FIG. 1 is a schematic-block diagram of a solar energy power plant using the storage-boiler of this invention. As shown, the system makes use of a plurality of solar energy collector-furnaces 10 in which a chemical working fluid is dissociated with absorption of heat. The heated working fluid is directed to a central heat exchanger 11 which directs the hot, energy rich working fluid into the energy-storage boiler tank 12. The energy-storage boiler tanks are utilized to produce steam on demand which steam is directed to a steam-electrical generating facility 13. The system is shown with oil storage tanks 14 which can be used to fire a boiler in an emergency in case the sun does not shine over a long period of time.

Figure 2:
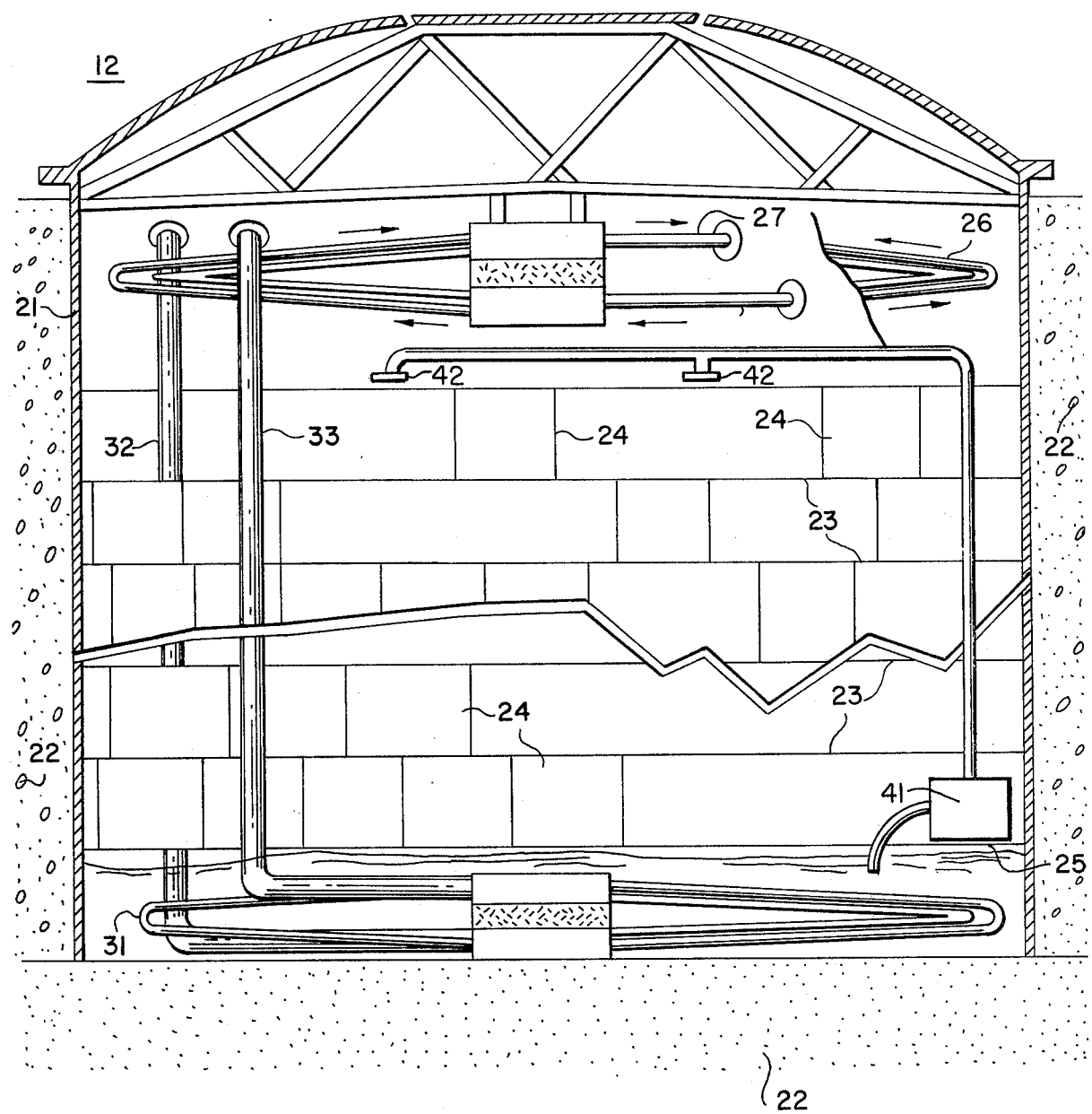
FIG. 2 illustrates a side view of the energy storage boiler tank showing the operative elements therein.

FIG. 2 illustrates the solar energy storage boiler tank which constitutes the subject of this invention. As shown, the energy storage-boiler tank includes at least one air tight housing 21 which is buried under ground or if above ground includes a surrounding of about 40 inches of silica fiber insulation 22 to avoid the loss of heat. The tank includes a plurality of rows of shelves 23 therein which rows extend across the space substantially from wall to wall in rows from near the bottom to the top area. Closely spaced metal canisters 24 containing a fusible salt mixture such as a $MgCl_2$, NaCl eutectic are placed on the shelves such that the alternate layers of canisters are staggered with relationship to the adjacent layers (only a few canisters are shown for clarity). The bottom area of the tank below the bottom layer of shelves includes a compound 25 such as tetraphenylsilane which gives off vapors when boiled. The upper most area of the tank includes a network of boiler tubes 26 which connect with a single outlet line 27 and a single inlet line 28. The outlet line connects with a steam operated device such as a steam operated electrical generator. The inlet line is a return line for water which water is converted to steam.

The bottom of the tank includes a network of heat releasing pipes 31 which are connected with an inlet pipe 32 and an outlet pipe 33. The inlet pipe admits hot fluids produced by a solar system or any other suitable system to the pipe network. Alternatively the inlet pipe admits a chemically reactive chemical fluid which liberates heat as it reacts and flows through the piping. Either type of fluid gives off heat to the tetraphenylsilane to produce evaporation thereof. Hot fluid in the pipe network is cooled by the release of heat and returned through the central heat exchanger 11 where it is further cooled and hence flows through the outlet pipe back to the solar heater system or other system.

In operation, hot fluid from a solar system or other system is admitted to flow through the pipe network in the bottom of the tank. Heat is released by the pipe network and absorbed by the tetraphenylsilane sufficient to vaporize the compound. The hot vapors condense onto the pipe network 26 in the upper area of the tank to transmit heat to the pipes thereby producing steam which is conducted through the outlet pipe 27 in the upper area of the tank. During vaporization of the tetraphenylsilane the vapors also condense onto the outside surfaces of the canisters of salt. The heat transferred to the salt melts the salt in order to store heat within the salt filled canisters. Condensation on the boiler tubes at the top of the energy-storage tanks provides on-demand steam during daytime hours during which the sun shines. Condensation on the canisters of salt stores heat in the salt for use during non-sunlight hours.

During non-sunlight hours, a pump 41 is provided to pump the tetraphenylsilane up over the canisters through spray nozzles 42 to wet-spray the canisters. Thus, heat is absorbed from the canisters to evaporate the tetraphenylsilane which vapors condense onto the boiler pipes to heat the boiler pipes thereby producing steam. Thus, the system is operative during non-sunlight hours as well as during sunshine hours.

The energy storage-boiler has been shown with the heat transfer pipes in the bottom of the tank and the boiler pipes within the upper area of the tank. Each of these may be placed on the outside of the tank in heat transfer contact with the tank surface. Further, the heat source in the bottom of the tank may be an electrical coil or any other type heating means where one is interested in using the tank as an energy storage means for times during which heat energy is not applied to the liquid in the bottom of the tank. The tank is closed so that it is fluid tight therefore heat released by the fluid heating means causes boiling of the fluid in the bottom of the tank which raises the pressure of the fluid vapor within the tank so that condensation occurs on all surfaces which are cooler than the heated fluid. Condensation ceases when exposed surfaces reach the temperature of the fluid in the bottom of the tank. This endpoint temperature is above the melting point of the salt eutectic contained in the canisters. Thus energy flows from the fluid condensing vapor into the walls of the salt canisters and into the salt interior thereby melting the salt. Once salt melting is completed, the temperature of the liquid salt and of all other portions of the tank rises towards a limiting value equal to the temperature of the heated fluid in the bottom of the tank. At this point, energy input ceases. During the time that the salt is absorbing heat and melting, vapors are also condensing onto the boiler pipes transfering heat to the boiler pipes which heats the water therein to produce steam which steam is used to drive an electrical generator or any other steam operated device. During heat application to the fluid in the bottom of the tank the fluid is the hottest part of the system.

During the time no heat energy is put into the fluid in the bottom of the tank, the fluid will no longer be the hottest part of the system and the salt canisters will be the hottest part. In this situation, the liquid in the bottom of the tank is sprayed by pumping onto the outer surface of the canisters to keep the surface of each canister wet. Since no heat is applied to the salt in the canisters, the salt will begin to "freeze" thereby giving off heat. The heat given off by the "freezing" salt results in evaporation of the surface film of liquid on the canisters to maintain a high pressure of fluid vapor throughout the interior of the air tight tank. Water returned to the boiler pipes causes condensation of the vapor onto the boiler pipes which pipes absorb heat to change the incoming water to steam. Simultaneously condensate drops off the boiler pipes onto the canisters which along with the liquid in the bottom of the tank continually wets the surface of the canisters.

The heat will be given off by the canisters until all of the salt within the canisters has frozen. Once this happens, heat must be applied to the liquid in the bottom of the tank to start the process over again, as described above.

It will be obvious to one skilled in the art especially in operation of a solar system to apply heat from the solar system to the liquid in the bottom of the tank for such operation whenever the sun is available for operation. The melted salt canister energy storage will be used only when heat is not available to heat the liquid in the bottom of the tank.

When heat energy is applied to the liquid in the bottom of the tank and withdrawn from the energy storage-boiler tank simultaneously, condensation on the surface of the salt canisters and on the steam generator boiler tubes proceed in parallel. During this time, operation of the liquid circulation pump and spray system is not required and the pump spray system is turned off and not operated.

It has been determined that SOLCHEM system can produce heat energy in the heater-piping of about 460° C. A salt eutectic of NaCl, $MgCl_2$ has a melting point of about 450° C. and the liquid used in the bottom of the tank (tetraphenylsilane) has a boiling point at 1 atmosphere of pressure of about 428° C. The applied heat energy is sufficient to boil the liquid in the bottom of the tank at an elevated pressure and the vapor is sufficiently hot to melt the salt within the canisters and to change the water in the boiler pipes to steam. As stated previously if a solar system is not used, any other heat system may be used which produces sufficient heat to vaporize the liquid in the bottom of the tank at a suitable pressure and a temperature above the melting point of salt. Under preferred operating conditions initial air in the tank is removed prior to system use, so that no air resistance to flow of vapors is encountered.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An energy storage-boiler means, which comprises:
    a housing having a closed top and bottom,
    a vaporizable compound in the bottom area of said housing,
    a plurality of layers of salt filled canisters substantially filling said housing above said vaporizable compound;
    a plurality of boiler pipes in the closed top area of said housing above said salt filled canisters;
    an input and output connected with said boiler pipes; and
    a heat energy release means near the bottom of said housing for transferring heat energy to said vaporizable compound in the bottom area of said housing.

2. An energy storage-boiler means as claimed in claim 1; wherein,
    said salt in said canisters is selected from a group consisting of $MgCl_2$, NaCl, KCl, $CaCl_2$, and $FeCl_2$.

3. An energy storage boiler means as claimed in claim 1, which includes;

pump and spray means to carry said vaporizable compound from said bottom area of said housing to the exterior surfaces of said salt filled canisters.

4. An energy storage boiler means as claimed in claim 2; wherein,
said compound in the bottom of said housing is tetraphenylsilane.

5. An energy storage boiler means as claimed in claim 4; wherein,
said heat energy release means is a plurality of pipes through which a hot solution flows to release heat energy to said tetraphenylsilane.

6. An energy storage-boiler means as claimed in claim 3; wherein
said compound is a phenylated compound.

7. An energy storage-boiler means as claimed in claim 3; wherein
said compound is a phosphorous sulfide compound.

* * * * *